United States Patent [19]

Rion

[11] Patent Number: 5,308,108
[45] Date of Patent: May 3, 1994

[54] MANIFOLD OR RETAINER FOR A GAS GENERATOR

[75] Inventor: Robert B. Rion, Redford, Mich.

[73] Assignee: Allied-Signal Inc., Morristown, N.J.

[21] Appl. No.: 966,763

[22] Filed: Oct. 26, 1992

[51] Int. Cl.$^5$ .............................................. B60R 21/26
[52] U.S. Cl. .............................. 280/728 A; 280/740; 280/741
[58] Field of Search ................... 280/728, 732, 728 A, 280/736, 737, 740, 741, 742; 102/530, 531; 222/3; 422/164, 165, 166, 167

[56] References Cited

U.S. PATENT DOCUMENTS

| | | | |
|---|---|---|---|
| 3,567,245 | 3/1971 | Ekstrom | 280/737 |
| 4,153,273 | 5/1979 | Risko | 280/728 A |
| 4,944,527 | 7/1990 | Bishop et al. | 280/728 A |
| 5,031,932 | 7/1991 | Frantom et al. | 280/737 |

Primary Examiner—Karin L. Tyson
Attorney, Agent, or Firm—Markell Seitzman

[57] ABSTRACT

A manifold (10) for holding a generally cylindrically shaped gas generator (12), the gas generator including inflation ports (26a, b) through which inflation gas exits to inflate an air bag, the manifold being a hollow extruded structure (14) having a cylindrical middle portion (16) and first (32) and second (34) ends, the middle portion formed having a diameter section slightly larger than the diameter of the gas generator, a diameter of the first end being smaller relative to the diameter of the middle portion to provide an interference fit with a mating portion of the gas generator upon insertion of the gas generator; the middle portion further having two opposingly positioned outwardly flared portions (18a, b), the flared portions in cooperation with walls of the gas generator, defining open chambers to receive inflation gas from the gas generator, the flared portions each including at least an exit port (44a, d, 46a) to direct inflation gas out of the manifold.

7 Claims, 3 Drawing Sheets

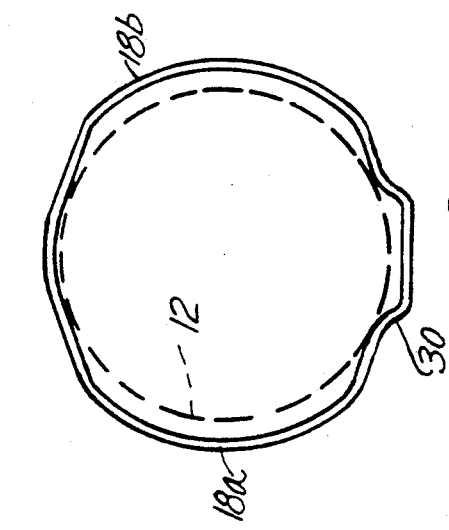
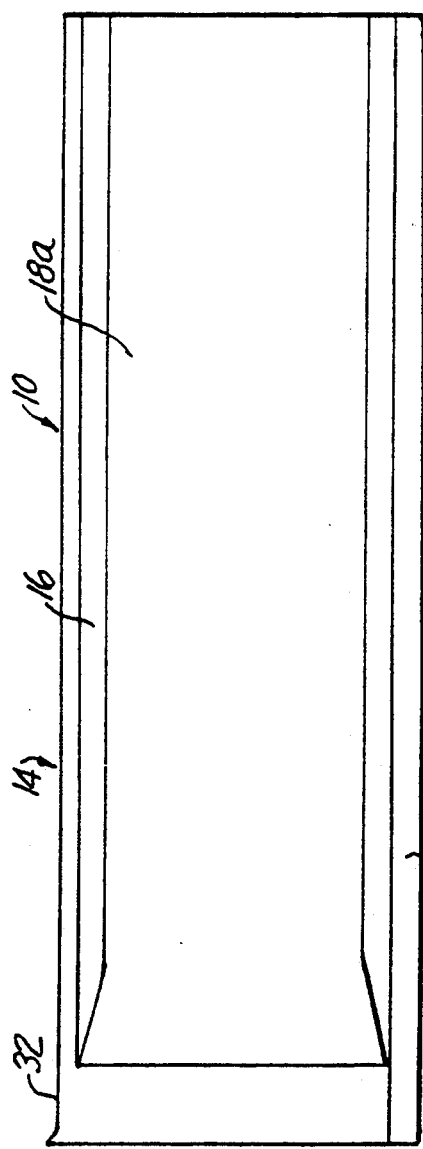
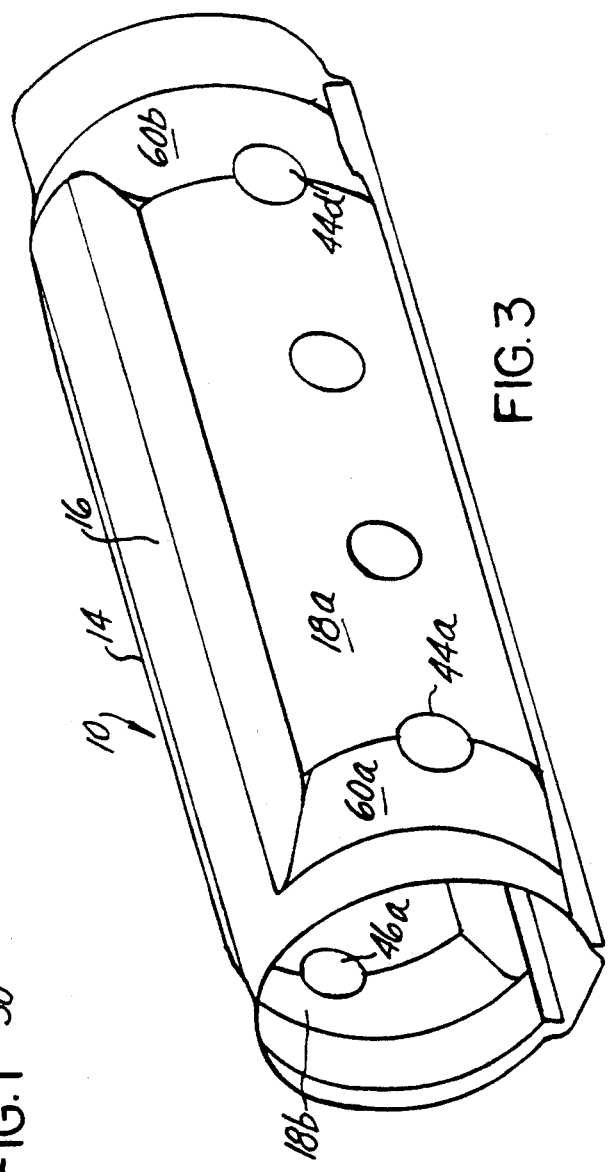

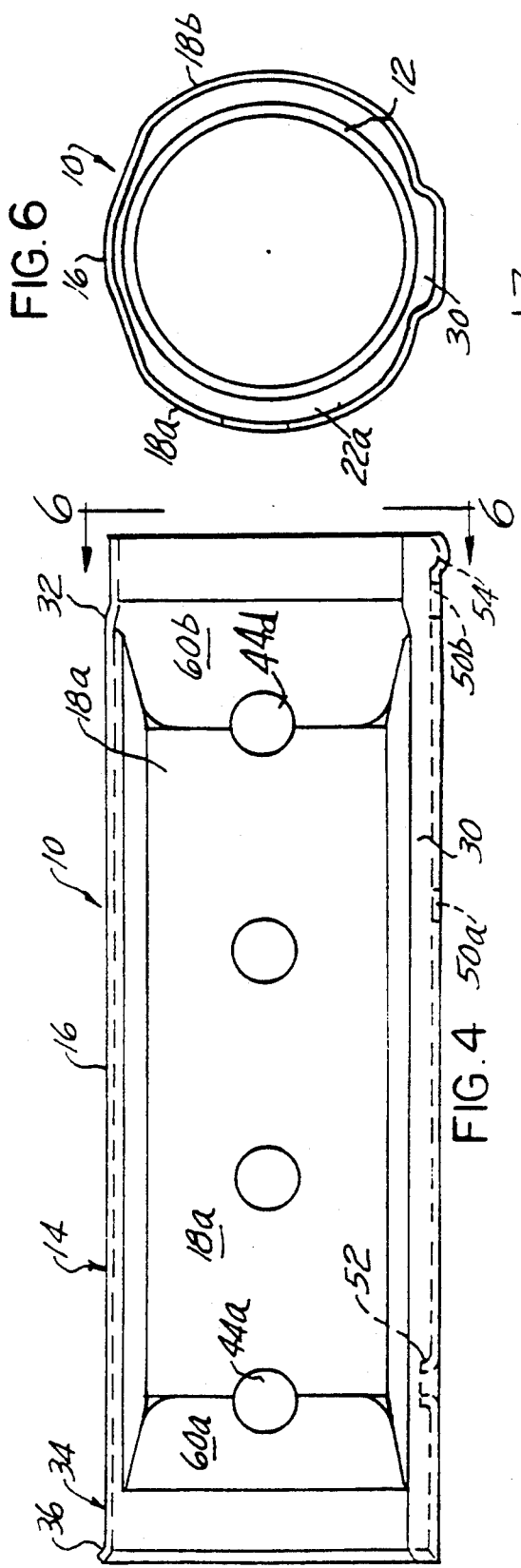
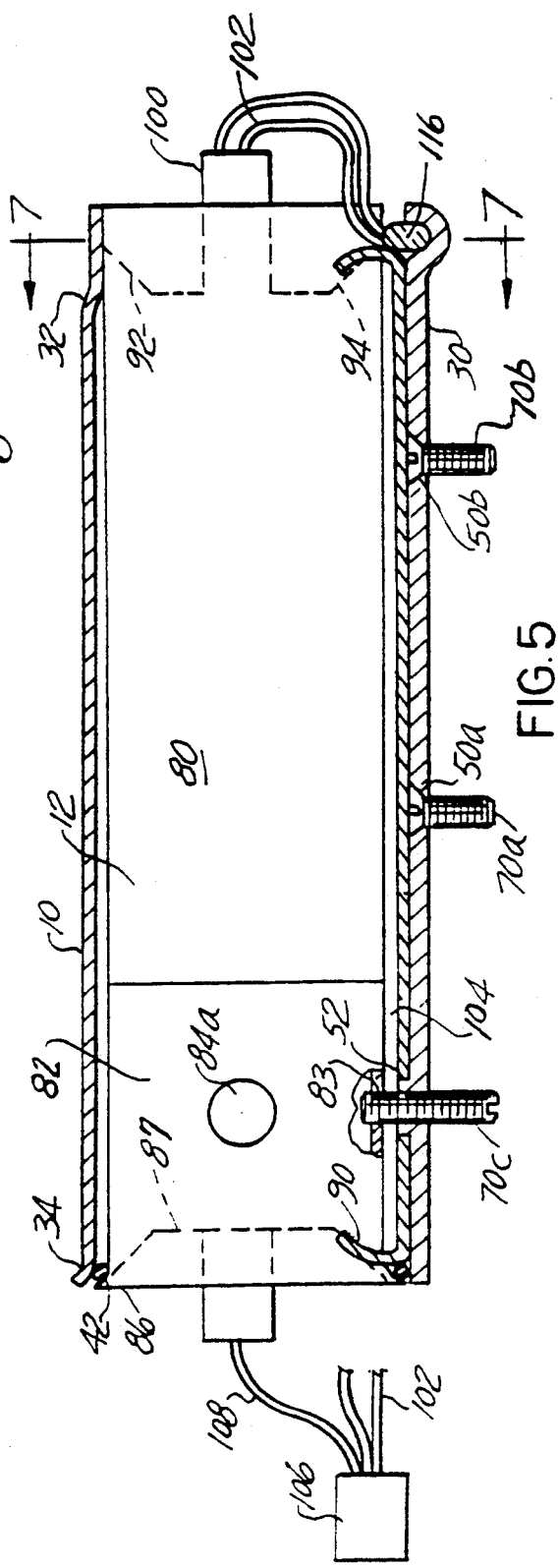

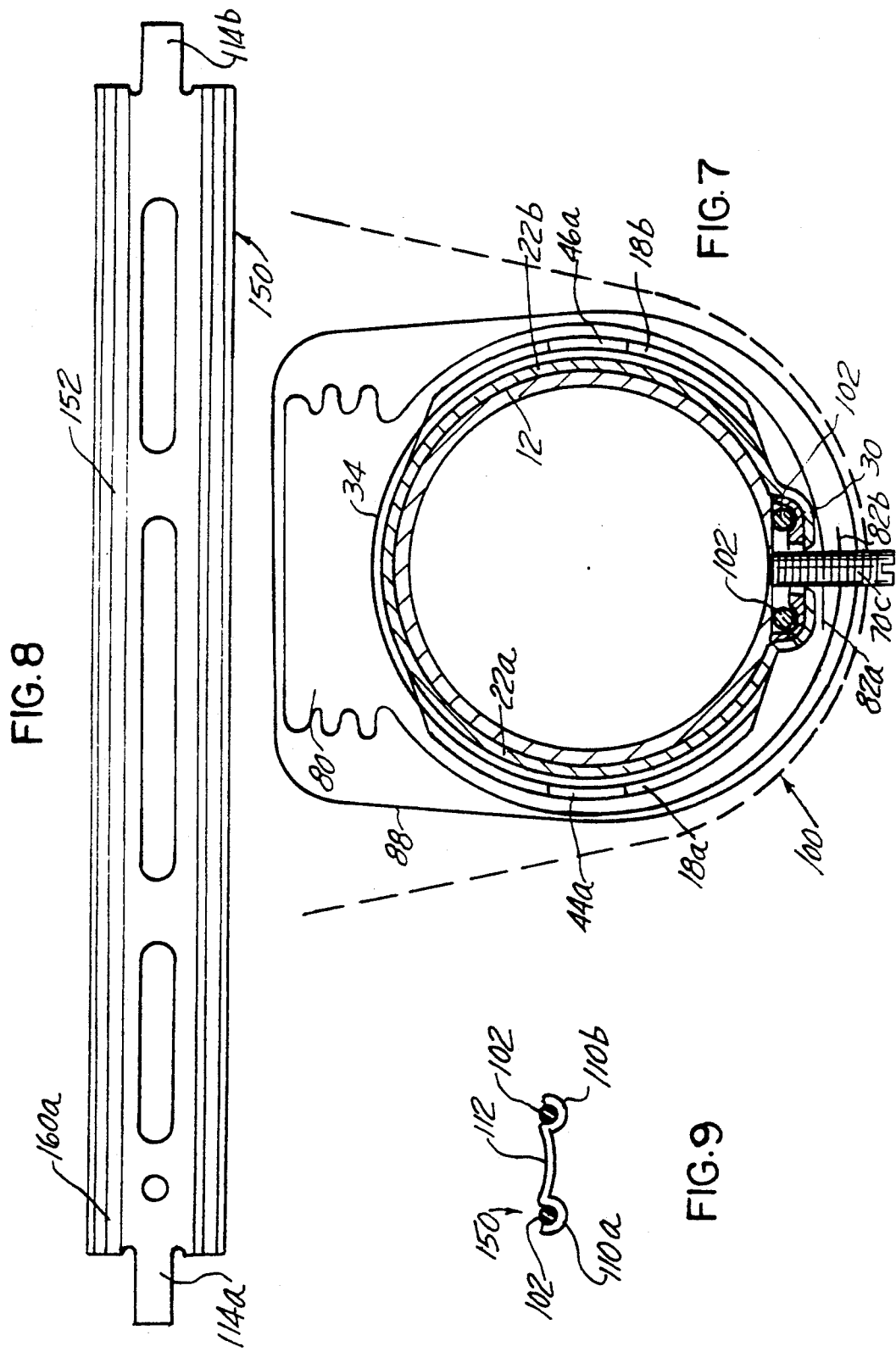

MANIFOLD OR RETAINER FOR A GAS GENERATOR

BACKGROUND AND SUMMARY OF THE INVENTION

The present invention relates to a structure for supporting a gas generator for an air bag and more specifically a manifold or retainer.

The present invention finds application as a part of an air bag safety restraint system and more specifically for a passenger side air bag system. Characteristically passenger side safety restraint systems include a gas generator for generating or producing inflation gas to inflate an air bag. Typically, the gas generator may be secured in place by a manifold or retainer. One such combination is illustrated in U.S. Pat. No. 5,062,664. Thereafter, the air bag is secured about the manifold to receive inflation gases. The manifold or retainer may be secured to a reaction can or directly to a cooperating structure within the vehicle.

It is an object of the present invention to provide a manifold which is easy to manufacture and one which displays a robust structure.

Accordingly, the invention comprises a manifold for holding a generally cylindrically shaped gas generator, the gas generator including inflation ports through which inflation gas exits to inflate an air bag. The manifold comprises a hollow extruded cylindrical structure comprising a cylindrical middle portion. A first end of the structure has a diameter slightly smaller than to the diameter of the middle portion of the gas generator, that is, upon insertion of the gas generator into the manifold. The middle portion of the cylindrical structure further comprising two outwardly flared opposing portions. The flared portions in cooperation with the gas generator, defines cavities or chambers to receive inflation gas exiting the gas generator. The flared portions each include a plurality of openings to direct inflation gas out of the manifold.

Many other objects and purposes of the invention will be clear from the following detailed description of the drawings.

BRIEF DESCRIPTION OF THE DRAWINGS

In the drawings:

FIG. 1 shows a plan side view of a partially formed manifold.

FIG. 2 is a cross-sectional view through Section 2—2 of FIG. 1.

FIG. 3 illustrates a projected view of manifold constructed in accordance with the present invention.

FIG. 4 illustrates a side plan view of the manifold.

FIG. 5 illustrates a cross-sectional view of the manifold and a gas generator.

FIG. 6 is a cross-sectional view through Section 6—6 of FIG. 5.

FIG. 7 is a cross-sectional view through Section 7—7 of FIG. 5 and also diagramatically illustrates an air bag.

FIG. 8 shows a plan view of a wire track.

FIG. 9 is a cross-sectional view of the wire track.

DETAILED DESCRIPTION OF THE DRAWINGS

The invention includes a manifold 10 comprising a hollow cylindrical structure generally shown as 14 fabricated of an aluminum alloy such as 6063T6. The manifold 10 is extruded into a cylindrical shape having a cylindrical middle portion 16, and a plurality of opposing outwardly flared side portions 18a and 18b having a substantially constant diameter as shown. FIG. 1 shows a side plan view of the initial extruded shape of the manifold 10 and FIG. 2 shows a cross-sectional view. FIG. 2 includes a phantom line defining the outside of a gas generator which will be referred to below. When the manifold is first formed, it additionally includes an axially directed, outwardly extending projection 30, the purpose of which will become clear from the description below. The extruded manifold 10 is thereafter formed into the shape as illustrated in FIGS. 3 and 4. More specifically, the right hand end 32 is formed by known metal forming techniques narrowing its diameter to provide for an interference fit with a corresponding end of a cylindrically shaped gas generator 12, as shown in FIG. 5. The opposite end 34 of the manifold 10 is formed with an outwardly extending flared portion 36.

A plurality of openings 44a, d are then formed in one of the flared side portions such as 18a, b and a second set of openings 46a is formed in the oppositely positioned side portion 18b. Only opening 46a can be seen in FIG. 3. In addition, a plurality of openings 50a and 50b are formed in the protrusion 30 as shown in FIG. 4. An additional opening, formed as an inwardly directed threaded boss 52, is formed in the protrusion by known metal forming techniques. In addition, a groove 54 is also formed in the protrusion 30 near its right hand end. At the time the various ends 32 and 34 of the manifold 10 are formed as described above, the ends such as 60a and 60b of each side portion 18a and 18b are bent downwardly to give these side portions the truncated or somewhat trapezoidal shape as shown in FIGS. 3 and 4.

In the preferred embodiment of the invention it is envisioned that the gas generator 12 used is a hybrid gas generator, as shown in FIG. 5. Characteristic of hybrid gas generators is that they include a pressure vessel portion 80 typically used to store a quantity of pressurized Argon gas and an activation portion 82 adjacent to the pressure vessel portion. Typically, the activation portion 82 includes a squib and a small quantity of propellant that is used to open a passage typically closed by a rupture disk leading from the pressure vessel portion 80. Upon opening the disk, the Argon gas exits from the at least two oppositely positioned exits (only exit 84a is shown). The purpose of the propellant is to provide additional heat energy to heat the exiting cold, stored Argon gas to improve the efficiency of inflation. The activation portion 82 also includes a threaded hole 83 to receive a fastener as described below. To maintain the gas generator in a thrust neutral condition the gas exits 84a and 84b are angled upwardly about 8 degrees from the horizontal to compensate for any gas that might flow through hole 83 if the gas generator should activate during handling or shipping prior to installation in the manifold. As illustrated in FIG. 5, the inflator 12 is formed with corresponding flared lip 86 in a cup shaped end 87 of the activation portion 82. A notch 90 is formed in the lower part of the lip 86. An O-ring 42 is disposed about the gas generator so that when the gas generator 12 is inserted within the manifold 10 the O-ring will provide for a tight rattle-free fit against the flared portion 36. An end 92 of the gas generator 12 tightly fits within the narrowed end 32 of the manifold 10. Upon insertion of the gas generator 12 into the manifold 10 the walls 92 of the gas generator 12 form, in concert with the outwardly extending portions 18a and 18b, a plurality of cavities or chambers 22a and 22b for receiving inflation gas generated by the gas generator 12, as seen in FIG. 6. Reference is briefly made to FIG. 2 which also shows an alternate embodiment of the invention. As shown therein the manifold is tangent to or lightly touching the gas generator 12 to enclose the chambers 22a and 22b along the length of the gas generator.

As previously mentioned, the protrusion 30 includes the openings 50a and 50b. A plurality of fasteners such as 70a and 70b are press fit within the corresponding openings 50a and 50b. These fasteners will provide a means for attaching the manifold 10 and gas generator 12 to a cooperating structure such as a reaction can 100 (shown in phantom line in FIG. 7) or directly to a mating portion of the vehicle structure (not shown) so that the gas generator as well as the air bag attached thereabout is correctly positioned relative to a deployment door to permit the proper deployment of the air bag. The third fastener 70c is threaded within the internally directed boss 52. After the installation of the gas generator 12 within the manifold 10, the fastener 70c enters hole 83 or alternatively engages a recess or butts against a wall of the gas generator to provide a means for axially locking the gas generator 12 to the manifold. As can be appreciated, the fastener 70c engages a non-pressure vessel portion, i.e., activation portion 82 of the gas generator. The activation portion end 87 of the gas generator is secured to the manifold through the O-ring support and the fastener 70c locks the gas generator axially to the manifold. As can be seen from the construction of FIG. 5, the other end 92 of the gas generator is secured to the manifold by the interference fit proximate end 32 of the manifold 10.

Prior to installation of the gas generator 12 to the manifold 10, the air bag 80, shown in FIG. 7, in its folded configuration is placed about the manifold 12. Typical of air bag designs is that the air bag comprises an open end comprising a plurality of flaps 82a and 82b which are placed in overlapping relationship relative to the fasteners 70a-70c. Each of these flaps 82a and 82b includes a plurality of openings through which the fasteners 70a-70c extend. As is also known in the art the air bag may be maintained in its folded configuration by enveloping same with a tearable liner 88 which opens or tears apart upon inflation of the air bag.

As previously mentioned, the manifold 10 is formed with an integrally constructed protrusion 30 and the present invention will be utilized with a hybrid inflator or gas generator. Typically these gas generators may include a low pressure switch 100 positioned in the end cup shape 90 of the gas generator 12. The end 92 includes a notch 94 similar to notch 90 in the flared lip 86. These low pressure switches include a plurality of electric wires 102. The wires 102 can be maintained in place by a wire track 150 positioned against the gas generator 12. A plan view of the wire track 150 is shown in FIG. 8 and a cross-sectional view is shown in FIG. 9. The track 150 provides a means for receiving and protecting the wires as well as for providing a means for feeding the wires 102 to the other end of the gas generator so that these wires 102 may be combined within a single wiring harness 106 with other electrical wires such as 108 which extend from the squib portion of the gas generator. As can be seen, the wire track includes two grooves 110a and 110b into which each wire 102 is placed. Thereafter, the middle section 112 is placed against the bottom of the gas generator 12 trapping the wires in the grooves. The tabs 114a and 114b are bent about the ends 87 and 92 of the gas generator 12 and fitted into the respective grooves or notches 90 and 94. With the wires in place the gas generator is slid into the manifold 10 and the gas generator secured in place. As can be appreciated, the protrusion 30, the wire track 150 and the gas generator 12 do not fit tightly together, and as such some inflation gas might escape through the end of the protrusion 30. This is remedied by forming in the protrusion a groove 54 and inserting therein a section of resilient material 116 such as rubber which extends slightly into the center of the manifold. As can be seen, the material 116 closes the right hand end of the protrusion 30. Upon insertion of the gas generator 12 into the manifold 10, the resilient material 116 engages the notch 94, in which the tab 114b of the wire track 150 is placed.

As can be appreciated when the gas generator is activated, all of the inflation gas exits at one end thereof. Absent the manifold 10, an air bag mounted about the gas generator might tend to initially inflate asymmetrically. This is not the case when using the manifold as it provides a reliable, robust, rigid structure to channel the inflation gas into the chambers 22a and 22b and then out openings 44a, d to provide for a more uniform inflation of the air bag.

Many changes and modifications in the above described embodiment of the invention can, of course, be carried out without departing from the scope thereof. Accordingly, that scope is intended to be limited only by the scope of the appended claims.

I claim:

1. A manifold (10) for holding a generally cylindrically shaped gas generator (12), the gas generator including inflation ports (26a, b) through which inflation gas exists to inflate an air bag, the manifold comprising:
    a hollow one piece extruded cylindrical structure (14) comprising:
    a cylindrical middle portion (16) and first (32) and second (34) ends, the first end being narrowed to provide an interference fit with a mating portion of the gas generator upon insertion of the gas generator, the middle portion having a first walled portion, having a diameter section slightly larger than the diameter of the gas generator;
    the middle portion further comprising two opposingly positioned outwardly flared portions (18a, b) extending outwardly from the first walled portion and having a substantially constant diameter thereacross larger than that of the first walled portion, each flared portion including a second walled portion and ends tapering to the first walled portion, the flared portions in cooperation with walls of the gas generator, defining gas receiving portions (22a, b) to receive inflation gas from the gas generator, the flared portions each including at least an exit port (44a-d, 46a-d) to direct inflation gas out of the manifold.

2. The manifold as defined in claim 1 wherein the structure (14) additionally includes on a lower portion thereof, an axially directly outwardly extending protrusion (30) between the two opposing flared positions to receive electrical wires running substantially the length of the structure (14), the wires emanating from one end of the gas generator.

3. The manifold as defined in claim 1 wherein the gas generator inflation ports are located proximate only one end thereof in communication with the flared portion and each flared portion includes a plurality of exit ports through which inflator gas may exist.

4. The manifold as defined in claim 2 wherein the second end is conically shaped to receive a conically shaped end of the gas generator, and wherein a resilient member (42) disposed therebetween.

5. The manifold as defined in claim 2 wherein the protrusion (30) includes a plurality of openings to receive fastener means, the fastener means providing a means by which at least the manifold and gas generator can be secured to a cooperating structure.

6. The manifold as defined in claim 5 wherein one of the plurality of openings is formed by an inwardly directed threadable boss to receive a fastener one end of which extends from the boss to lock the gas generator in place, the other end of the fastener adapted to be secured to cooperating structure.

7. A manifold (10) for holding a generally cylindrically shaped gas generator (12), the gas generator including inflation ports (26a, b) through which inflation gas exits to inflate an air bag, the manifold comprising:

a hollow extruded structure (14) comprising:

a cylindrical middle portion (16) and first (32) and second (34) ends, the middle portion having a diameter section slightly larger than the diameter of the gas generator, the first end being narrowed to provide an interference fit with a mating portion of the gas generator upon insertion of the gas generator;

the middle portion further comprising two opposingly positioned outwardly flared portions (18a, b), the flared portions in cooperation with walls of the gas generator, defining gas receiving portions (22a, b) to receive inflation gas from the gas generator, the flared portions each including at least an exit port (44a, d 46a) to direct inflation gas out of the manifold; wherein one end of the gas generator includes a notch (94) therein positioned facing and spaced from the extending protrusion (30), the protrusion supporting sealing material (116) closing the protrusion (30) and notch.

* * * * *